(12) United States Patent
Cook (10) Patent No.: US 10,069,332 B2
(45) Date of Patent: Sep. 4, 2018

(54) ELECTRICAL POWER STATUS INDICATOR

(75) Inventor: Charles Ivan Cook, Louisville, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1044 days.

(21) Appl. No.: 13/488,665

(22) Filed: Jun. 5, 2012

(65) Prior Publication Data

US 2013/0320776 A1 Dec. 5, 2013

(51) Int. Cl.
  *H01H 35/00* (2006.01)
  *H02J 13/00* (2006.01)

(52) U.S. Cl.
  CPC ........ *H02J 13/002* (2013.01); *H01H 2300/03* (2013.01); *Y02B 70/3241* (2013.01); *Y02B 90/224* (2013.01); *Y02B 90/2615* (2013.01); *Y04S 20/14* (2013.01); *Y04S 20/227* (2013.01); *Y04S 40/121* (2013.01); *Y10T 307/832* (2015.04); *Y10T 307/865* (2015.04)

(58) Field of Classification Search
  CPC ............................... Y04S 20/227; H02J 13/00
  USPC ........................................................ 307/1
  See application file for complete search history.

(56) References Cited

U.S. PATENT DOCUMENTS

| | | | | |
|---|---|---|---|---|
| 7,982,335 B2* | 7/2011 | Aldag | .................. | H01R 25/142 307/11 |
| 8,295,990 B2* | 10/2012 | Venkatakrishnan | ... | G06Q 50/06 700/291 |
| 2001/0025349 A1* | 9/2001 | Sharood | ............. | G06Q 30/0235 713/340 |
| 2003/0050737 A1* | 3/2003 | Osann, Jr. | .............. | G05B 15/02 700/276 |
| 2007/0136217 A1* | 6/2007 | Johnson | ................. | G06Q 50/06 705/412 |
| 2008/0221737 A1* | 9/2008 | Josephson | ................ | G01D 4/02 700/276 |
| 2009/0103228 A1* | 4/2009 | Elderbaum | ............ | H01H 9/167 361/187 |
| 2010/0017045 A1* | 1/2010 | Nesler | ................. | B60L 11/1824 700/296 |
| 2011/0015802 A1* | 1/2011 | Imes | ................... | G05D 23/1923 700/300 |
| 2011/0202185 A1* | 8/2011 | Imes | ...................... | G05B 15/02 700/277 |
| 2011/0202198 A1* | 8/2011 | Venkatakrishnan et al. | | ................ 700/296 |
| 2011/0202418 A1* | 8/2011 | Kempton | ............ | B60L 11/1824 705/26.1 |
| 2012/0109395 A1* | 5/2012 | Finch | ..................... | G06Q 50/06 700/295 |

(Continued)

*Primary Examiner* — Jared Fureman
*Assistant Examiner* — Emmanuel R Dominique
(74) *Attorney, Agent, or Firm* — Swanson & Bratschun, L.L.C.

(57) ABSTRACT

An electrical power status-indicating device for integration with a Smart Grid network. The device comprises an electrical receptacle installed within a wall of a consumer premises, a communication module for retrieving and interpreting power status data from a centralized control module, and at least one indicator activated by the communication module, with activation based at least in part on the status data. In some embodiments, the device may comprise a power pass-through device for receiving at least one in-premise electronic device, and/or a light switch in communication with a lighting unit.

33 Claims, 7 Drawing Sheets

(56) References Cited

U.S. PATENT DOCUMENTS

2012/0310800 A1* 12/2012 Xia ................... G06Q 50/06
705/34

* cited by examiner

ELECTRICAL POWER STATUS INDICATOR

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure is related to technology for managing electric energy consumption. It is particularly concerned with systems for enabling electricity consumers to monitor a status of a utility's electric power grid and to adjust their electric power consumption accordingly.

BACKGROUND

Technological advancements for transmission systems and infrastructures, such as the Smart Grid, allow for a two-way communication of power grid-related data between electric utility companies and their customers. Such data, which may reflect the supply and consumption of electricity at the utility company, might be collected at any moment and continuously throughout the lifetime operation of the power grid. The data may be monitored and analyzed by the utility company for controlling the power grid. It also can be broadcast to the utility company's customers. The customers who receive the data might respond, depending on the data received, by altering their electric consumption. For example, a consumer might choose to delay the operation of an electrical appliance if she receives data indicating that the price of electricity is particularly high at that moment.

Utility companies are motivated to adopt technological advancements such as the Smart Grid, because they provide useful tools that can increase the service and reliability of the power grid. For instance, Smart Grid allows the utility to acquire data on grid conditions and to control grid operation, such that utility companies can optimize their management of peak demands, resulting in more efficiency in supplying power. Likewise, consumers are motivated to implement the Smart Grid capabilities for benefits including reducing their monthly electricity bills and smarter electricity consumption.

Current implementations that are available to consumers are cumbersome, however. Typically, consumer devices for interfacing with Smart Grid data communication are centrally located, rather than available throughout multiple locations in a consumer's home. The devices are also complex and often provide detailed information that may be difficult for consumers to interpret directly. Consequently, the current devices are not able to provide effective communication or usage to the consumer. Furthermore, Smart Grid data is limited for use by Smart Appliances that are programmed to interpret the data and adjust consumption accordingly. Hence, there is a need for an electricity consumption management option that addresses these issues.

The present disclosure is intended to overcome one or more of the problems discussed above, and to provide related advantages.

BRIEF SUMMARY

Certain embodiments provide tools and techniques for enabling electricity consumers to monitor a status of a utility's electric power grid and to adjust their electric power consumption accordingly. In an aspect of some embodiments, a power status-indicating electrical receptacle can comprise an electrical receptacle adapted for installation within a wall of a customer premises. The electrical receptacle might be configured to receive input electric current and provide output electric current. The power status-indicating electrical receptacle may further comprise a communication module (which can include, without limitation, a power line communication ("PLC") receiver module and/or other communication module) that continuously retrieves and interprets power status data from a centralized control module.

In some embodiments, the power status-indicating receptacle may have one or more indicators that are activated by the communication module. Activation of the indicators may be based at least in part on the status data. The power status data might comprise, merely by way of example, grid loading status and/or utility billing tier status. In another aspect, the electrical receptacle might comprise an electrical outlet, a light switch configured to selectively provide power to a lamp external to the electrical receptacle, or any other suitable receptacle.

Various embodiments can employ a wide variety of indicators to indicate power status information. Merely by way of example, in some embodiments, the indicator might comprise a periodic flashing of a lamp receiving power from the receptacle (when the lamp is on), and/or a dimming of the lamp. Alternatively an/or additionally, the indicator might comprise, for example, a luminary indicator incorporated within the electrical receptacle itself, a surface of the electrical receptacle configured as the luminary indicator, and/or a multi-colored LED on a surface of the electrical receptacle. In another embodiment, the indicator might comprise an audio indicator and/or might be configured by optional settings corresponding to the time of day. In another embodiment, the indicator may comprise a display screen.

Some embodiments can provide an electrical receptacle that adjusts a power output level of the electrical receptacle under predetermined conditions. In some aspects, adjusting the power output level might include, merely by way of example, turning the power output on or off, and/or reducing or increasing current supplied through the receptacle. In another aspect, the power level might adjusted be based on sensing a power draw from the electrical receptacle that exceeds a threshold level of power draw. In one embodiment, the centralized control module may interface with the Internet to retrieve the status data.

Another set of embodiments provides a power status-indicating electrical pass-through device. The electrical pass-through device might comprise an electrical plug and at least one electrical socket. The device might further comprise a communication module (such as a PLC receiver and/or other wireline and/or wireless communications module) for retrieving (e.g., continuously, periodically and/or on demand) and interpreting power status data from a centralized control module, which might be located at the consumer premises, at the utility provider, or at any other suitable location (such as "in the cloud"). Such data might comprise, merely by way of example, a grid loading status and/or a utility billing tier status, an indication of the amount of power consumed through the receptacle, the crossing of any power consumption thresholds, and/or the like. The power status-indicating electrical pass-through device might further comprise one or more indicators, which could be activated, e.g., by the communication module. Activation, in some aspects, might be based at least in part on the power status data. In some cases, the electrical device of the power status-indicating electrical pass-through device can be a power strip and/or a power outlet expander.

Another set of embodiments comprises a power status indication device having a first communication interface for providing communication with a centralized communication module. The power status indication device may further comprise a signal receiver module to continuously receive and interpret power status data from the centralized control module. In an aspect, a power status indication device may further comprise a second communication interface for communication with at least one appliance connected to the home network. Further, the power status indication device might comprise a signal transmitter to transmit electrical signals for reception by the at least one appliance. Such electrical signals may be transmitted in response to predetermined conditions that are based at least in part on the power status data.

In an aspect, the power status indication device might further comprise an input to receive input electric current, and an output to provide output electric current to the at least one appliance. In some cases, the output power level of the output electric current may be modified by the power status indication device in response to receiving an instruction signal over the first communication interface. In a particular embodiment, the power status data comprises the instruction signal, and in some cases, the instruction signal may, merely by way of example, comprise communication from a user. In some aspects, the communication from the user is received from a remote control device, for instance, and merely by way of example, through a mobile telephone or computer, a remote control device (which might transmit via Bluetooth, infrared, Zigbee, Z-Wave, WiFi, etc.).

In some aspects, the transmitted electrical signal might activate an indicator (such as those described above), which can include, inter alia, a luminary indicator, visual indicator, and/or display screen indicator to indicate the power status. In another aspect, the at least one appliance might comprise a smart appliance that adjusts a power usage of the smart appliance in response to the transmitted electrical signals. In other aspects, the second communication interface might perform power on and off functions for the at least one appliance. In a further embodiment, the predetermined conditions are based at least in part on profile data that is established by at least one of a utility company and a user. In another embodiment, the power status indication device might comprise an override option that may be activated by an override signal from at least one of a utility company and a user.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
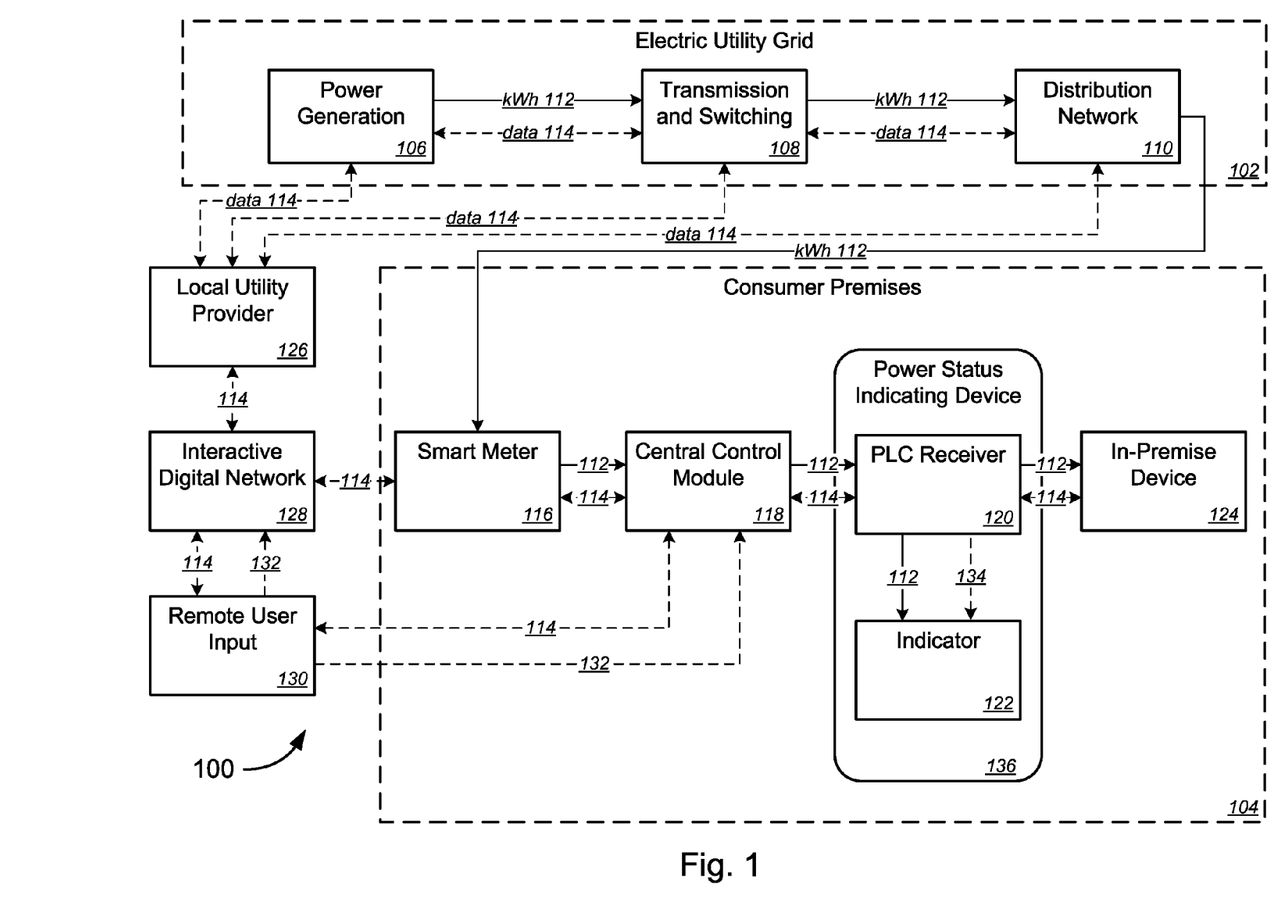
FIG. 1 is a generalized graphical representation of a smart-grid network comprising an electric utility grid and a consumer network.

FIG. 1 illustrates a general graphical representation of a smart-grid network 100. The smart-grid network 100 comprises an electric utility grid 102 and consumer premises 104. The electric utility grid 102 may include a power generation module 106, transmission and switching module 108, and a distribution network 110. The smart-grid network 100 is configured to support a flow of electrical power 112 (e.g., electrical current delivered to residential premises at 220V/120V in the United States), denoted as kWh on FIG. 1, which is delivered from the electric utility grid 102 to the consumer premises 104. The smart grid network 100 is further configured to support a two-way dynamic flow of information, represented as data 114, between all components of the electric utility grid 102 to a local utility provider 126 that ultimately provides data 114 to components within the consumer premises 104. It should be noted that FIG. 1 is meant only to provide a general and simplified illustration of a smart-grid network 100 configuration.

In the electric utility grid 102 of FIG. 1, electricity is generated at the power generation module 106, which can include, merely by way of example, large-scale centralized energy generation centers such as industrial size solar plants, wind energy centers, hydropower plants, nuclear, fossil fuel, and/or also extensive distributed generation sources, such as local wind generators and photovoltaic systems. Electricity is typically produced at relatively lower voltages, and stepped-up with a power transformer to extra high and/or high voltages, depending on the generation source, for transmission over long distances. High voltage electricity travels through transmission lines and switching substations represented by transmission and switching module 108 to electrical substations located near demand centers. The local electrical substations step-down the power 112, to lower voltages for delivery to a plurality of local consumers connected to the distribution network 110, such as local households and businesses.

In the smart-grid utility network 100 of FIG. 1, the components of the electric utility grid 102 are linked to an interactive digital network that allows utility companies to monitor and/or control electricity generation, transmission, distribution and consumption, and further, allows consumers at the consumer premises 104 to receive data 114 to assess and control their own energy usage. Communication platforms for transmitting data 114 between the electric utility grid 102, local utility provider 126 and/or consumer premises 104, such as represented by the interactive digital network 128 module, may comprise, merely by way of example, the Internet, an Internet service provider ("ISP") network, a variety of broadband (e.g., xDSL, DOCSIS, wireless, etc.), 3G, 4G, and/or wireless networks, and/or any other suitable data transport. The consumer premises 104 might include a premises network (not illustrated on FIG. 1), which can employ any of a variety of wired or wireless networking technologies to distribute data to various devices (including without limitation those described herein) at the consumer premises 104 and/or with external data sources/sinks (such as the utility provider 126) via a connection (e.g., a broadband connection with an ISP) between the premises network and such data sources/sinks.

The data 114 traveling from the electric utility grid 102 to the local utility provider may comprise, merely by way of example, data points collected from Supervisory Control and Data Acquisition ("SCADA") and/or other industrial control systems implemented throughout the electric utility grid 102. This "raw" data, which may be collected continuously over time, or in time intervals, and can include any notifications, failure, maintenance and/or curtailment information, that is received at the local utility provider 126 may be processed and analyzed to yield further quantities and intelligence. For instance, processing raw data 114 might comprise, merely by way of example, producing electricity pricing, real-time pricing, time-of-day pricing, price scheduling and/or forecasts, and/or surplus electricity produced, among a variety of other data mining and analysis techniques that can be applied. Such "processed" data, which may be more consumer-friendly, can be communicated, in some instances along with raw data, through an interactive digital network 128 and received at one or more devices within the consumer premises 104 (e.g., via a connection between a premises network and the interactive digital network 128). Concurrently, data 114 generated at the consumer premises 104 and communicated to the local utility provider 126 may comprise, merely by way of example, energy usage data and/or preferences. Such "consumer" data may be further analyzed by the local utility provider 126 to assess, for instance, surplus energy produced during time intervals throughout the day. It should further be noted that the smart-grid utility network 100 can be capable of supporting multiple other commodities, for example, controlling and/or monitoring the distribution of water and gas.

In particular, FIG. 1 illustrates, as a simplified schematic, power 112 reception and data 114 ingress/egress at the smart meter 116 of a single consumer premises 104, which may represent a single residential or business location. The smart meter 116, typically centrally located at the consumer premises 104, can be utilized to measure electricity consumption within consumer premises 104 from pass-through of power 112. The smart meter 116 might also be configured to send, receive/retrieve, and in some aspects process data 114 incoming from the local utility provider 126 through an interactive digital network 128. In some aspects, the data 114 may further comprise notifications, user or utility provider's commands, and/or additional information from the local utility provider 126, for example, consumer account information, load on the grid and billing tiers, which in some embodiments may not be readily interpreted by the smart meter 116. In such cases, a central control module 118 may be configured to process and/or receive those portions of "non-interpreted" data 114 from the smart meter 116. It should also be noted that the smart meter 116 can support the metering of other consumed commodities in addition to electricity, such as gas and water.

Figure 2:
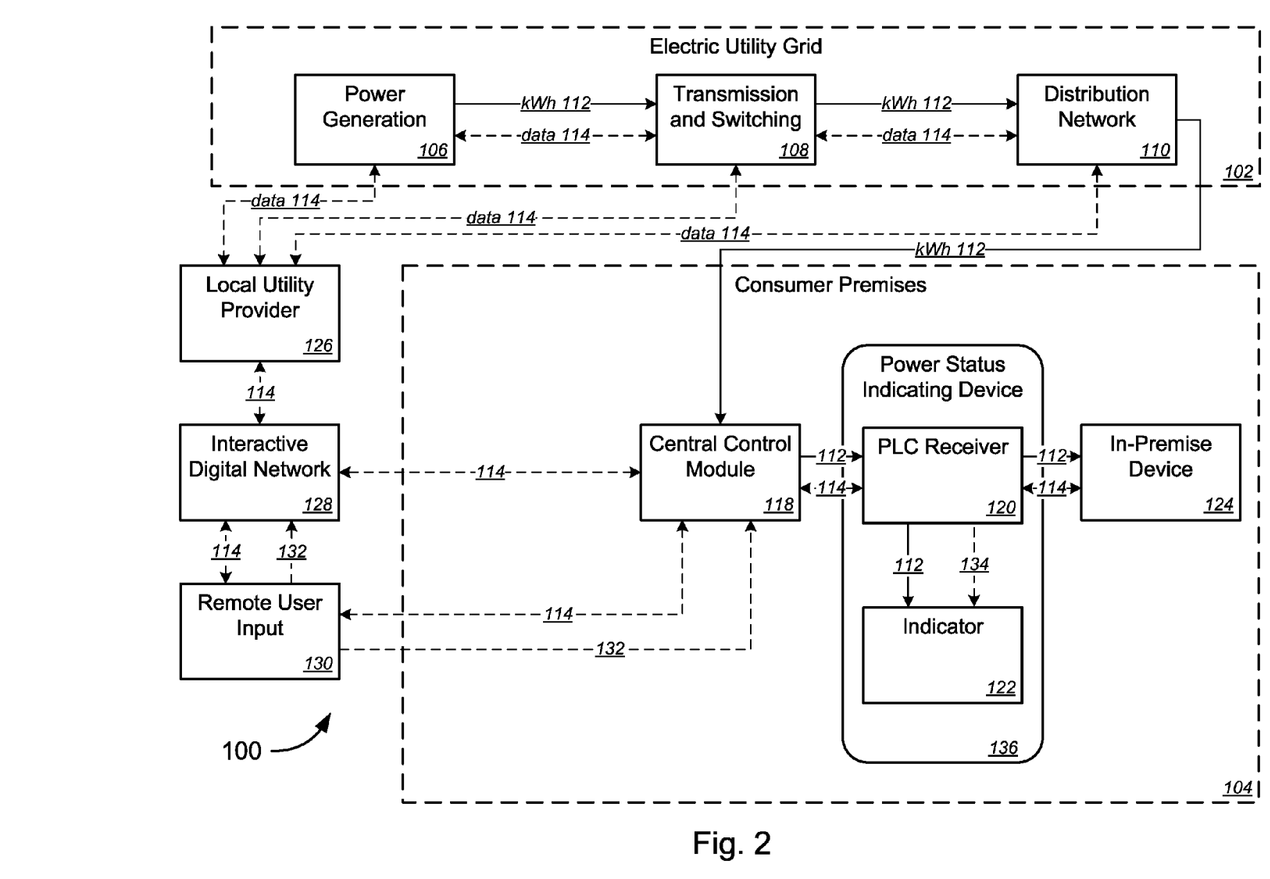
FIG. 2 is a general schematic of a smart-grid network in which the central control module is configured to link a consumer network directly with components outside of the consumer network.

Although FIG. 1 and FIG. 2 depict the central control module 118 as being located at the consumer premises 104, the reader should note that this location can vary in different embodiments. Merely by way of example, the central control module 118 might be located at the utility provider, and/or in a cloud computing environment away from the consumer premises 104. The location is discretionary, so long as the central control module 118 is capable of communicating with other system components (e.g., using any of the various communication techniques and/or protocols described herein) as described above and further below.

In another aspect, the incoming data 114 at the smart meter 116 and/or central control module 118 might comprise an input command 132 generated by remote user input 130. The remote user input 130 can generate the input command 132 from outside of consumer premises 104, or, in some embodiments, from a device that is located at the premises 104 and/or connected, permanently or temporarily, to a premise network at the consumer premises 104. For instance, in some embodiments, the remote user input 130 can be received from a remote control device (e.g., via infrared or any other suitable wireless or wired communication technique), a mobile telephone, computer, set-top box, and/or any electronic communications device, regardless of its physical location within or outside the customer premises 104. For example, the remote user input 130 might originate from a device of the consumer that is located outside of the consumer premises 104, or located within consumer premises 104 if the remote user input 130 provides easy access to controlling the smart meter 116 or other devices at the premises 104. In some embodiments, the remote user input 130 might originate from a plant operator, local utility provider 126, and/or any other persons authorized to set the input command 132.

The input command 132 might comprise any command for controlling and/or modifying the operation (and/or any features) of the central control module 118, the smart meter 116, the power-status indicating device 136 (described below) and/or components thereof, and/or an attached in-premise device 124. Such a command might include, merely by way of example, a manually selected user override command, a change in user settings, and/or user communication to the local utility provider 126. In another aspect, the input command 132 can be automatically generated at the remote user input 130 according to data 114 as it is received from the local utility provider 126 and/or smart meter 116 through interactive digital network 128, and/or data 114 that is communicated from the central control module 118, such as, and merely by way of example, consumer energy usage data and/or settings. It should be noted that data 114 may be safeguarded by encryption techniques, and as such, the smart meter 116, central communication module 118, and/or remote user input device 130 might be configured to support decryption and/or authentication processes. It should also be noted that the specific examples for the remote user input 130 and input command 132 are merely for suggesting possible embodiments, and not meant to be limiting by any means.

In a further aspect of the present disclosure, the central control module 112 may be configured to communicate using a home networking technology, such as universal serial bus ("USB"), Bluetooth, Ethernet, power line communication (PLC), WiFi, ZigBee, Z-wave, and/or other home sensor technologies. Such links may be configured to accommodate delivery of the interpreted and/or non-interpreted data 114, input command 132, and/or power 112 to an electrical power status indicating device 136, as shown in FIG. 1. In one embodiment, the electrical power status indicating device 136 comprises a PLC receiver 120 for communicating with the central control module 118, and activating at least one indicator 122. While the PLC receiver 120 might employ PLC-based communications, it might additionally and/or alternatively employ any other suitable communication methodology (including those described herein), and the use of the term, "PLC receiver," therefore should not, in itself, be considered to limit various embodiments to PLC-based communications.

The PLC receiver 120 might receive, in some embodiments, data 114 from the central control module 118, and further process the data 114 into power status data 134 for communication with indicator 122. Power status data 134 might comprise, merely by way of example, grid load and/or billing tiers, which may further be categorized to distinguish economic versus non-economic tiers of operation, for instance, non-economic periods of "high" grid loading or pricing. The indicator 122 might communicate certain power status data 134 by means of textual display screens, luminary indicators, and/or audio indicators powered by incoming power 112. Power status data 134 might also be communicated by the PLC receiver 120 to a user device, such as a notification, text, or email to a mobile telephone or computer, through its own connection with the home networking technology and/or via the central control module 118.

In another aspect, the PLC receiver 120 may further be connected to at least one in-premise device 124 to provide power 112 and communicate data 114 to and/or from the device 124. The in-premise device 124 might comprise, merely by way of example, any of a variety of household electronic appliances such as refrigeration devices, washers, driers, computers, televisions, sound systems, light fixtures, electric pass-through devices such as power strips, and/or smart appliances that are configured to receive and process data 114. The smart appliance may be configured to interpret data 114, which might comprise electricity pricing data and/or signals originating from the smart-grid network 100, interpreted data from the smart meter 116 and/or central control module 118, and/or data processed by the PLC receiver 120. Such data can include, merely by way of example, power status data 134. Such smart appliances might implement data 114 and/or power status data 134 in deciding the most economical mode and/or time for operation.

In other embodiments, if the in-premise device 124 is not configured to interpret data 114, for instance a non-smart appliance, the data signal 114 that accompanies the incoming electric power 112 might be ignored by the in-premise device 124. Alternatively, the PLC Receiver 120 may filter out the data 114 from the power 112, automatically or based upon user settings or selection, such that the in-premise device 124 does not receive the data signal 114. In a further aspect, the PLC receiver 120 may be configured to collect data 114 received, retrieved, and/or generated at the in-premise device 124 for communication with the central control module 118 and/or local utility grid 126. It should be noted that the consumer premises 104 may comprise a plurality of PLC receivers 120 in communication with the central control module 118, and each PLC receiver 120 may further comprise more than one in-premise device 124 and/or indicator 122. In some embodiments, the in-premise device 124 may be further configured to support additional devices, for instance if the in-premise device 124 comprises an electric pass-through power strip.

FIG. 2 illustrates a general schematic of the smart-grid network in which the PLC receiver 120 may be configured to interact directly with central control module 118, which receives outside data 114. In FIG. 2, the central control module 118 is fully capable of supporting data interaction (e.g., communication of data 114) with the local utility provider through the interactive digital network 128, and for receiving and metering power 112 from the distribution network 110 of the electric utility grid. In such an embodiment, the central control module 118 comprises a smart meter and eliminates the need for a separate smart meter 116. The central control module 118 may provide, in addition to smart meter 116 capabilities, processing of non-interpreted data 114 that smart meter 116 may not be configured to handle, for instance, and merely by way of example, notifications, user or utility provider's commands, and/or additional information from the local utility provider 126, for example, consumer account information, load on the grid and billing tiers, all of which, in some embodiments may not be readily interpreted by the smart meter 116. Such an embodiment may be practical, for instance, in circumstances in which the smart-grid network 100 is implemented at the consumer's local electric utility grid 102, but the consumer has not yet adopted the smart meter 116.

Alternatively and/or additionally, the user may choose to adopt a fully capable central control module 118 that can provide, in some embodiments, functions of the smart meter 116 in addition to more advanced data processing, analysis, user controls and consumer premises 104 home networking techniques. (Merely by way of example, the central control module 118, and/or a smart meter 116 might serve as a router for the premises network, a residential gateway to provide broadband connectivity for the premises network, etc. and/or might communicate with such devices.) Furthermore, in some embodiments, the central control module 118 may comprise a digital interface within the consumer premises 104, such as a web site and/or computer program. Additionally, the central control module 118 and/or the PLC receiver 120 may be user-programmable, such that the user may implement personalized settings, data analysis and processing techniques, and/or receive data provided by other third-party service providers. It can also be appreciated that FIG. 2, in some embodiments, depicts a central control module 118 that is an equivalent to a smart meter 116, in which the PLC receiver 120 may be configured to further process data 114 such as, and merely by way of example, notifications, user or utility provider's commands, and/or additional information from the local utility provider 126, for example, consumer account information, load on the grid and billing tiers.

It should be noted that, conventionally, a smart meter provides a utility provider with an indication of the power consumption of the consumer, and a smart meter can enables the utility provider to provide usage data to the consumer in a more granular fashion and potentially in real or near-real time. As such, various embodiments can be implemented either with or without a smart meter. Merely by way of example, smart meter functionality might be incorporated into the PLC receiver 120, the central control module 118, and/or any other appropriate device. Similarly, the consumer might incorporate his or her own energy consumption measurement devices, which can be interfaced with the central control module 118. Alternatively and/or additionally, functionality of the central control module 118 and/or other devices might be incorporated into the smart meter 116. Hence, as used herein, the term "smart meter" can be understood to mean a generic power consumption measurement device, one implementation of which might be a conventional smart meter.

Figure 3:
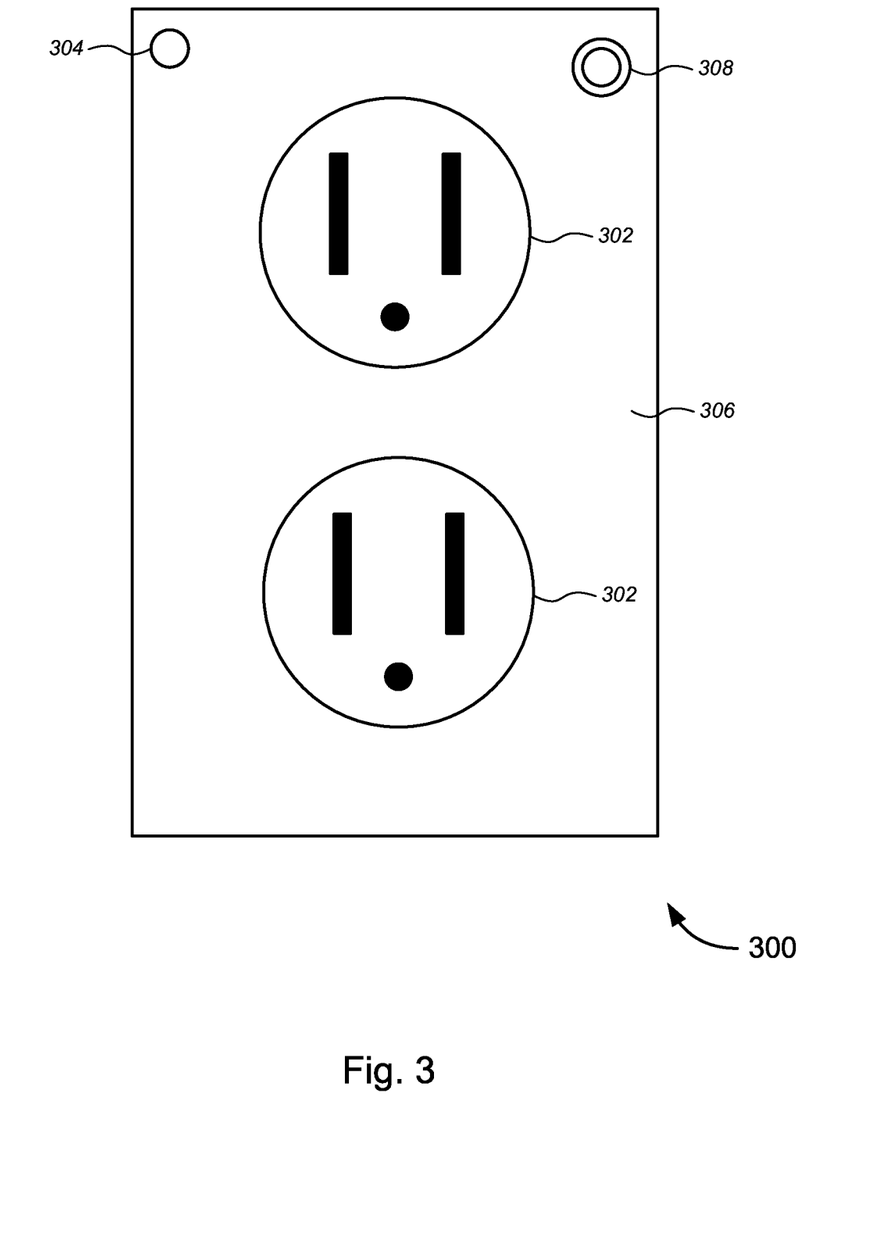
FIG. 3 is a frontal view of a faceplate of a power status indicating electrical receptacle.

FIG. 3 illustrates a front faceplate view of one embodiment of an electrical power status indicating device 136. The device 136, herein referred to as a power status-indicating electrical receptacle 300, further comprises at least one electrical outlet 302 and might comprise one or more of a variety of indicators 122, such as an LED indicator 304, and an audio indicator 308, which reside on a surface 306 and/or within the device 136 itself. In some embodiments, the power status-indicating electrical receptacle 300 can be adapted to be installed within a wall of a premises, for instance at the consumer premises 104, and configured to receive input electric current and provide output electric current, such as power 112.

The LED indicator 304 might be activated in response to a variety of conditions. Merely by way of example, the receptacle 300 might activate the indicator 304 be based at least in part on the power status data 134 processed by the PLC receiver 120. In some embodiments, the LED indicator 304 may be activated by the PLC receiver 120 when the power status data 134 indicates unfavorable periods to operate, for instance, during high electricity pricing and/or grid loading. In other embodiments, the LED indicator 304 may be activated when the power status data 134 indicates favorable periods to operate, for instance when electricity prices are low and/or low grid loading. In another embodiment, the LED indicator 304 can indicate both statuses with distinct colors, such as a multi-colored LED light that operates, for instance, and merely by way of example, green for favorable periods, and red for less favorable periods. In another embodiment, the electrical power status indicating 300 device might comprise a plurality of LED indicators 304, and/or each indicator might represent a different power status data 134. For instance, the LED indicator 304 could illuminate blue to indicate a typical billing tier is in effect, green to indicate an economy billing tier is in effect, and/or red to indicate that a peak billing tier is in effect and/or that grid load is unusually high at the time. In this way, the indicator 304 can provide input to the consumer to help influence the consumer's decision-making and/or behavior. In some cases, the LED indicator 304 could be unlit, indicating a defect in the receptacle 300 and/or that the power is off.

Another status indicator in accordance with other embodiments might include a power consumption threshold indicator. Merely by way of example, the consumer (and/or the utility provider or any other entity) might set a threshold to consume less than a certain amount of power during a specified interval. The threshold indicator could warn the consumer when he or she is approaching and/or has exceeded the threshold.

In another aspect, the LED indicator 304 might be removable from the faceplate; for instance, a separate removable LED indicator 304 strip, such that the LED indicator 304 may be visible in the event a plugged in-premise device 124 received at the outlet 302 covers the receptacle 300. Furthermore, the surface 306 may comprise the indicator 122; for example, the surface may illuminate to indicate the power status data 134.

In some embodiments, as further shown in FIG. 3, the power status-indicating electrical receptacle 300 might comprise an audio indicator 308, which might also activate based on power status data 134 and emit different sounds when the power status data 134 is, for example, too high, too low, or has changed. For instance, the audio indicator 308 may emit a single chirp to indicate a typical billing rate is in effect, double chirps if an economy billing rate is in effect, and triple chirps if there is significant load on the grid or when peak billing rates are in effect. In some embodiments, the audio indicator 308 emits the sound each time a power draw is sensed from the receptacle 300, for instance, when an in-premise device 124 that is already plugged in at the outlet 302 is turned on, or, simply when an in-premise device 124 is plugged in.

The audio indicator 308 may also accommodate user preferences, which can specify under what conditions, and how, the indicators should activate. Merely by way of example, the user might select muted audio during nighttime hours. Such settings might also be implemented with respect to the activation of the LED indicator 304 and/or illuminating surface 306. It can be appreciated that although FIG. 3 depicts a variety of indicators 122 on the same power status indicating electrical receptacle 300, such as the LED indicator 304, audio indicator 308, and the surface 306 capable of illumination, the power status indicating device 136 may comprise, in some embodiments, only one indicator 122, or any combination of such indicators 122 depicted without undermining the functionality of the device 136. Additionally, for a device 136 providing a plurality of indicators 122, in some embodiments, the user may select, through user preferences, which indicators 122 to activate.

In one particular embodiment of the power status-indicating electrical receptacle 300, the receptacle 300 can adjust its power output level according to the power status data 134. Adjusting the power output level might comprise varying the output, turning the power off, and/or turning the power on. In another aspect, the receptacle 300 can sense a level of power draw, and in response to the power draw exceeding a threshold level, the outlet may shut off for a predetermined amount of time. The threshold level can be determined by inputs communicated to the home network and received at the PLC receiver 120, for instance at a user preferences setting provided by the PLC receiver 120, and/or a photo sensor at the receptacle 300.

Figure 4:
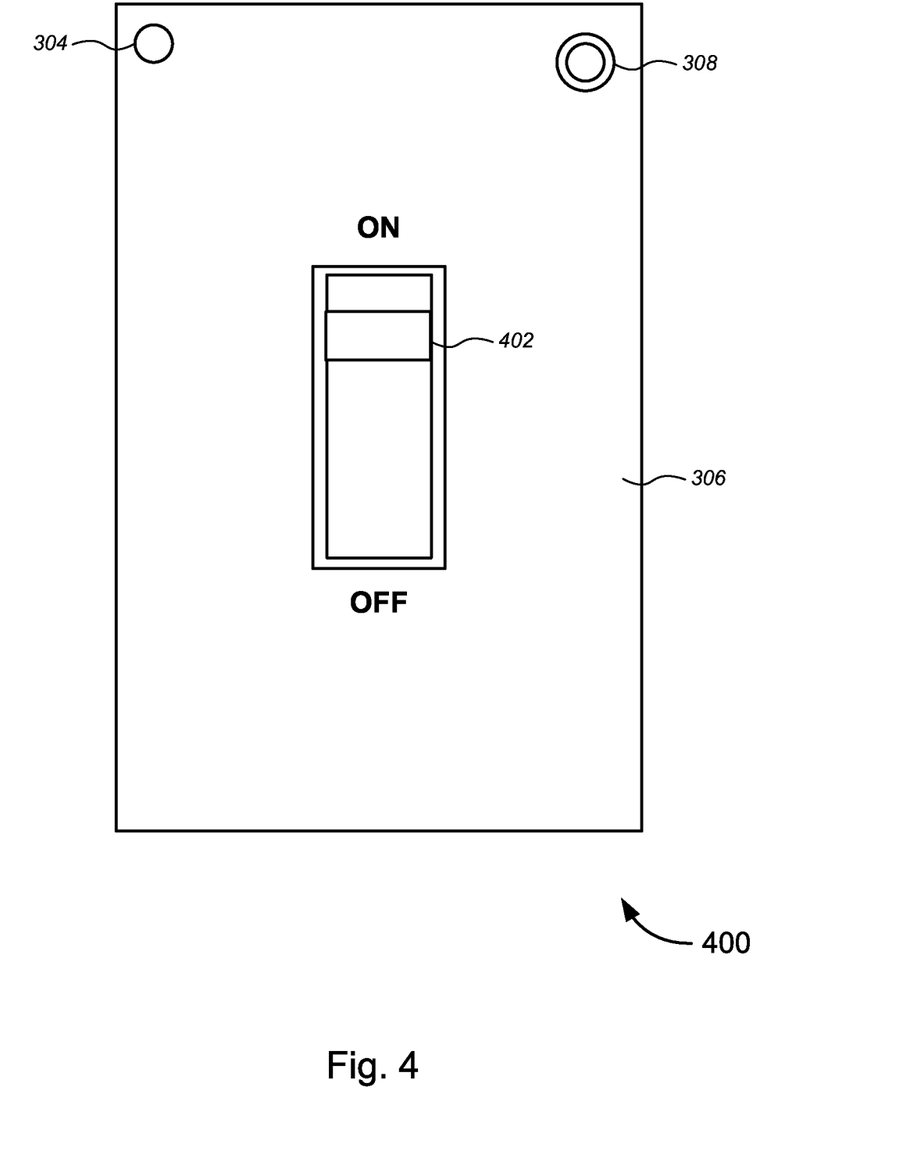
FIG. 4 is a frontal view of a faceplate of a power-status indicating light switch.

FIG. 4 depicts a front view of another embodiment of an electrical power status indicating device. In the illustrated embodiment, the device comprises a power-status indicating light switch 400 that might be configured to installed (e.g., in a standard junction box) in a wall at the consumer premises 104. The switch 400 may further comprise at least one handle 402 for manually controlling an associated lighting unit. The switch 400 may additionally provide at least one LED indicator 304 and an audio indicator 308 residing on a surface 306, all three indicators 122 which may operate as described in FIG. 3. Additionally, the switch 400 may adjust the power operating level of the lighting unit according to the power status data 134, for instance, with a dimming feature that dims the light during high billing rates and/or grid loading, turns the lights on during economical and/or typical billing rates, and turns the lights off during peak billing rates. The lighting unit of switch 400 might further serve as an indicator 122, whereby the light flashes, from on to off, or intermittent dimming patterns, during different billing rates and/or grid loading effects. User preferences for the LED indicator 304, audio indicator 308, surface 306 illumination, and/or lighting unit may, in some embodiments, be provided by the user preferences setting provided by the PLC receiver 120 of switch 400. In another aspect, the light switch 400 may further comprise additional electrical outlets 302.

Figure 5:
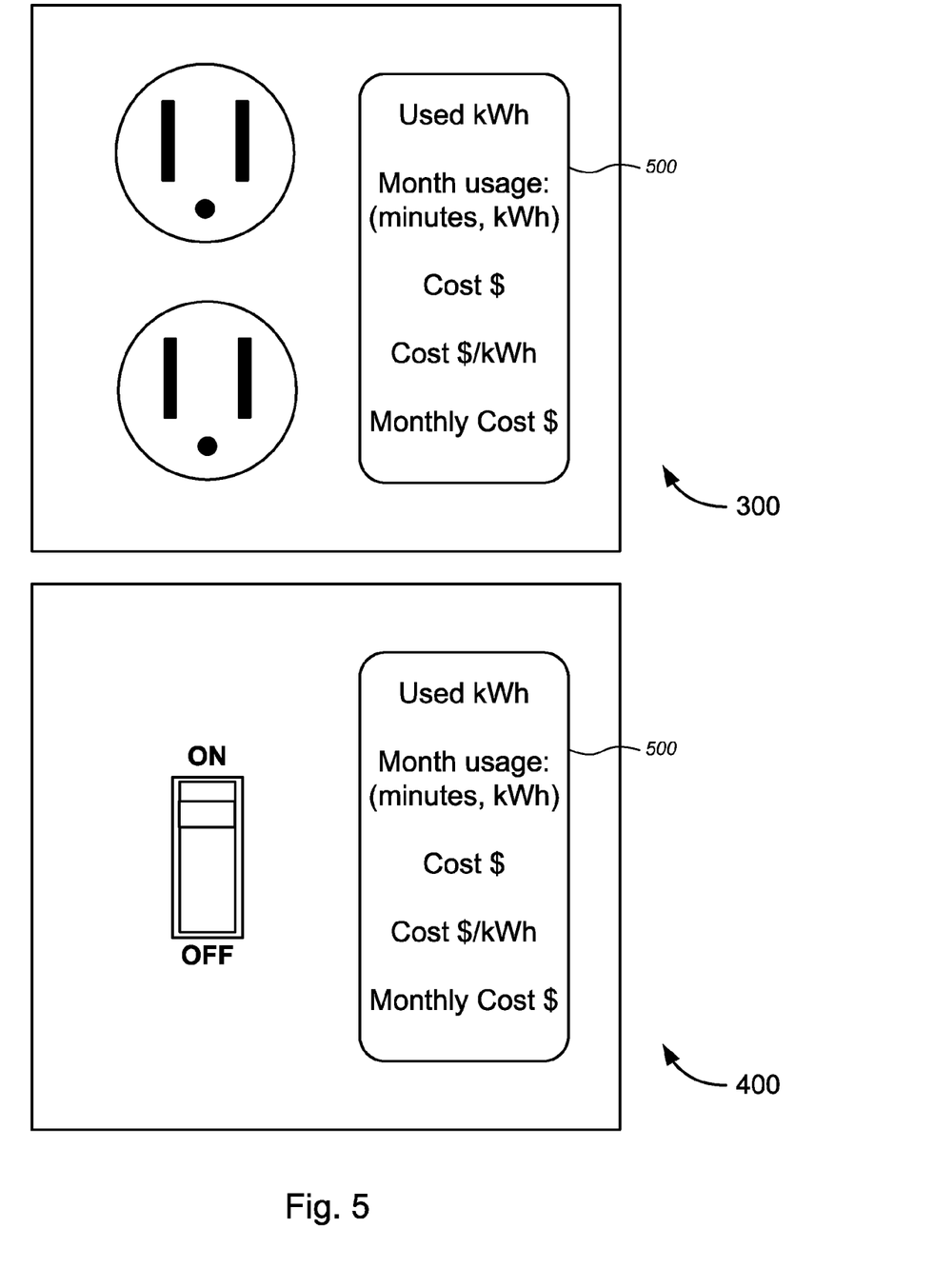
FIG. 5 is a frontal view of a power status indicating electrical receptacle and light switch, further comprising display screen indicators.

FIG. 5 illustrates two front views of the power status-indicating electrical receptacle 300 and the light switch 400 further comprising display screen indicators 500. The display screen indicator 500 may be configured to display power status data 134, for instance, and merely by way of example, the power used during a current session, total power used and/or time operated within a time period, electricity pricing, utility billing tier, grid loading, and/or total monthly cost. In some embodiments, the user may select through communication with the PLC receiver 120 the information to be displayed on the display screen indicator 500. In some aspects, the display screen indicator 500 may provide an interface for communicating with the PLC receiver 120, for instance, for inputting user settings and/or commands.

Figure 6:
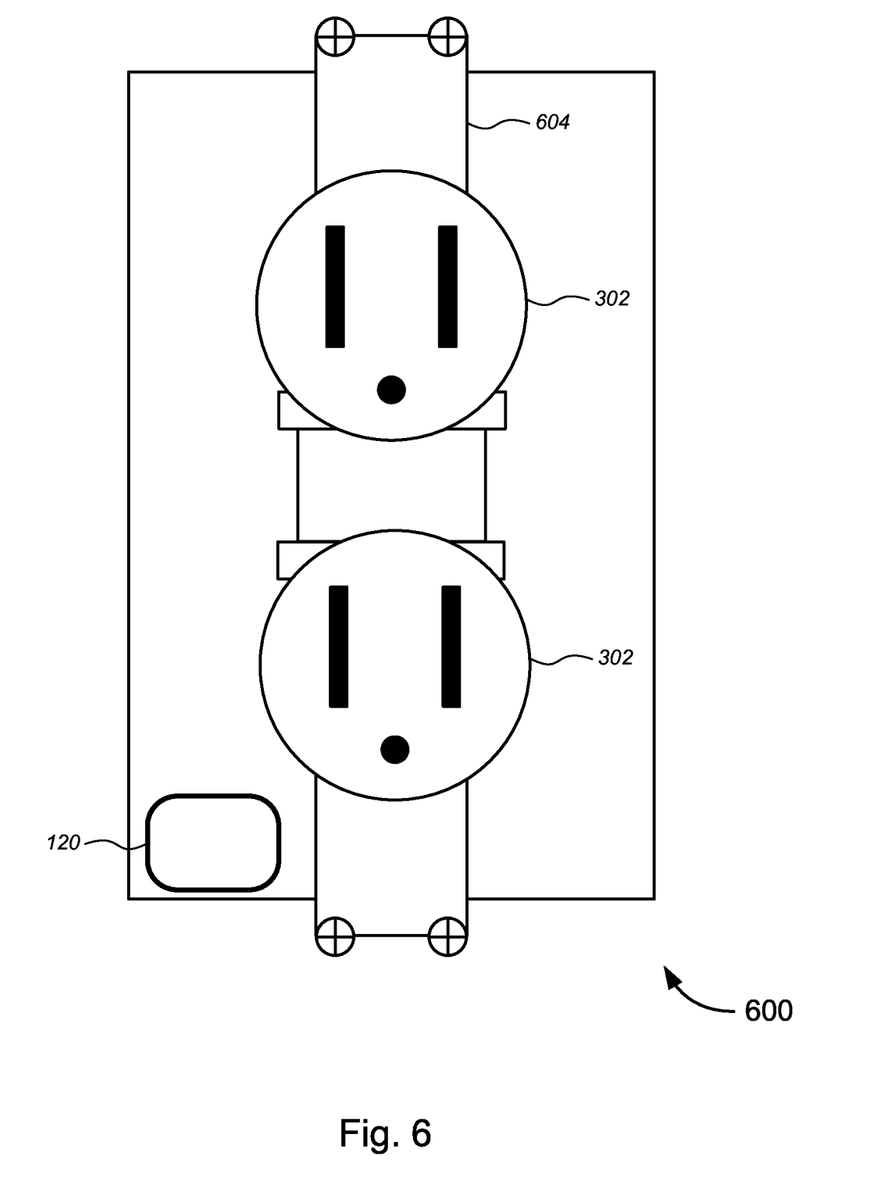
FIG. 6 is an illustration of a power status-indicating electrical receptacle with an embedded PLC receiver inside the receptacle housing.

FIG. 6 illustrates one embodiment of a power-status indicating electrical receptacle 300 with an embedded PLC receiver 120. The PLC receiver 120 might reside within the receptacle housing 600, and communicate with the electrical outlets 302 that are received on panel 604. Communication may comprise, in some embodiments, controlling the power output level of the electrical sockets 302, measuring the power draw from the sockets 302, and/or turning the power on/off. In another embodiment, the PLC receiver 120 is configured to activate an indicator 122, such as an LED indicator 304, audio indicator 308, and/or surface 306 luminary indicator based at least in part on the power status data 134 as processed by the PLC receiver 120 utilizing incoming data 114 from the local utility provider 126. In another aspect, the receptacle device 600 shown in FIG. 6 with the embedded PLC receiver 120 (and/or any of the other devices described above) may be configured to be received by an existing electrical receptacle (e.g., with two sets of three prongs to be plugged into a standard receptacle, such that the receptacle 600 of FIG. 6 fits over the standard, existing receptacle), thereby providing a mobile and retrofitting device.

Figure 7:
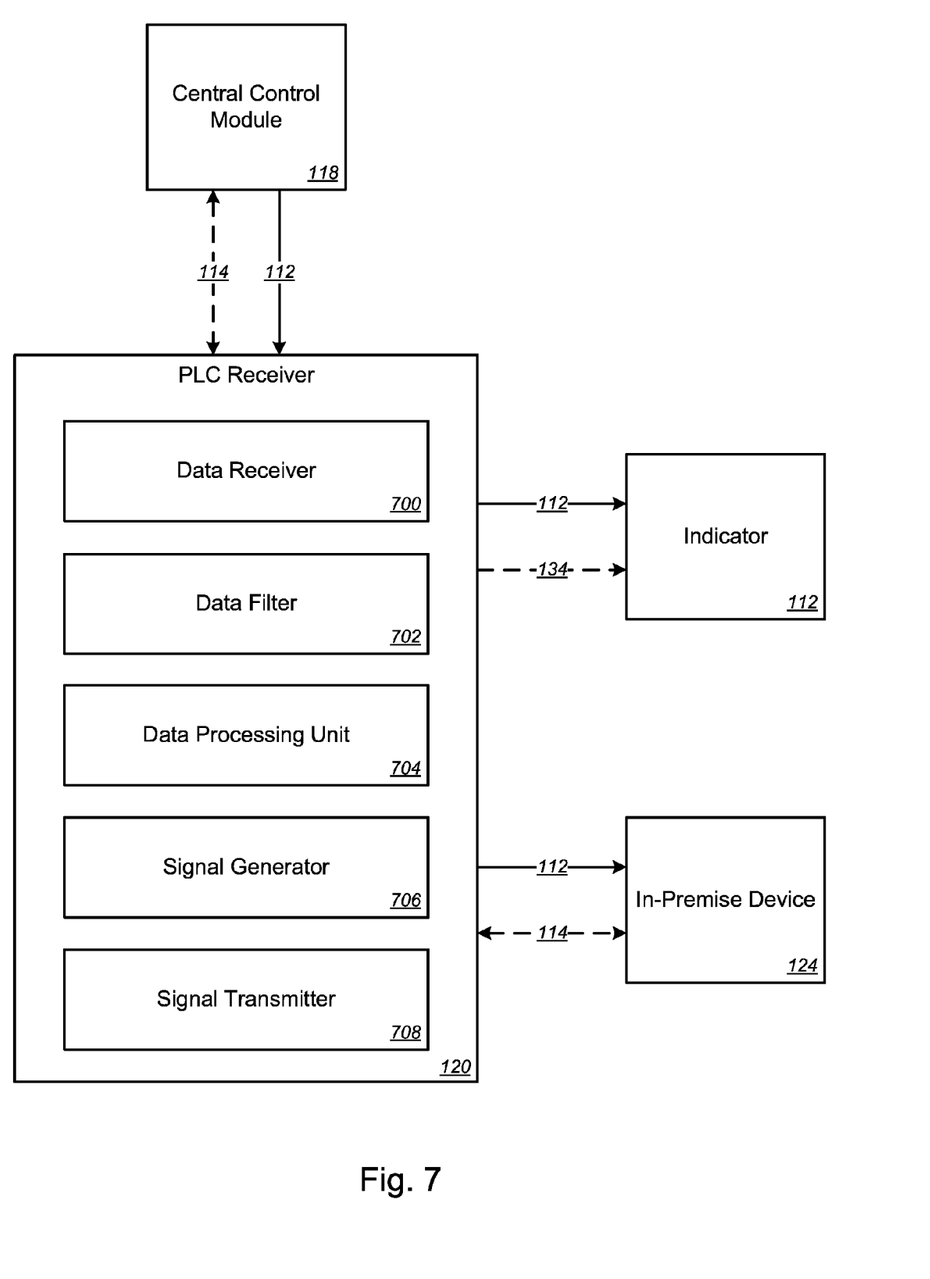
FIG. 7 is an illustration of various components within the PLC receiver.

FIG. 7 illustrates various components of the PLC receiver 120 that are configured to support data interaction with the central communication module 118, indicator 112, and in-premise device 124. In one embodiment, the PLC receiver 120 comprises a data receiver 700 configured to receive and/or retrieve data 114 from the central control module 118 and/or in-premise device 124. In some embodiments, data 114 received may be filtered at data filter 702, which may remove all or a portion of data 114 that is carried on an electrical wiring line of a powerline communications system. In another embodiment, the data filter 702 may distinguish and/or separate data 114 and power status data 134, for delivery to the central control module 118 and/or in-premise device, and to the indicator 112, respectively. In another embodiment, the PLC receiver 120 comprises a data processing unit 704 configured to process data 114 received from the central control module 118, such as data provided by the local utility provider 126. For instance, the data 114 may be processed into power status data 134 for activation of the indicator 112 based on grid load and billing rate tiers. The data processing unit 704 may, in some embodiments, process raw data received from the local utility provider 126, and/or further process data that has already been interpreted by a smart meter 116 upstream of the PLC receiver 120 and/or central control module 118. Furthermore, in some embodiments, the data processing unit 704 may be configured to support and store user input, such as user preferences. In another aspect of the present embodiment, the PLC receiver 120 may further comprise a signal generator 706 and a signal transmitter 708 to control the electrical power status indicating device 136 based on intelligence from the data processing unit 704, such as user settings, power status data 134, and/or an input command 132 comprising an instructional signal communicated to the central control module 118 and/or received at the interactive digital network 128. The signal transmitter 708 may be configured to transmit electrical signals to activate the indicator 122, and/or communicate with the in-premise device 124, based on such intelligence.

It should be noted that, while several exemplary embodiments describe electrical receptacles and/or switches with PLC capabilities, various embodiments are not limited to this form of communication. Rather, various embodiments can employ any of a variety of suitable communication technologies, which can be substituted for (and/or included in addition to) the PLC functionality described above. Such technologies can include those described above, such as a number wireless and/or wired communication technologies. Examples include, but are not limited to, Ethernet communications, wireless (e.g., 802.11x) communications, USB communications, etc.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A power status-indicating electrical receptacle, comprising:
    an electrical receptacle adapted to be installed within a wall of a premises and configured to receive input electric current and provide output electric current;
    a signal receiver to continuously retrieve and interpret power status data from a centralized control module, the power status data comprising real-time electricity pricing data received from an electrical utility provider, wherein the centralized control module is a residential gateway that provides broadband connectivity for a premises network of the premises, wherein the centralized control module analyzes non-interpreted data and generates interpreted data including power status data from the non-interpreted data; and
    one or more indicators activated by the signal receiver, the activation based at least in part on the status data, including the real-time electricity pricing data, the one or more indicators comprising a multi-colored LED indicator on the surface of the receptacle, the LED indicator displaying a first color based on the power status data indicating a favorable period to operate, based on the real-time electricity pricing data, and displaying a second color based on the power status data indicating an unfavorable period to operate, based on the real-time electricity pricing data.

2. The system of claim 1, wherein the centralized control module is located at the premises.

3. The system of claim 1, wherein the centralized control module implemented in a cloud computing environment separate from the premises.

4. The system of claim 1, wherein the signal receiver comprises a power line communication (PLC) receiver.

5. The system of claim 1, wherein the signal receiver comprises a wireless receiver.

6. The system of claim 1, wherein the power status data comprises a grid loading status.

7. The system of claim 1, wherein, the power status data comprises a utility billing tier status.

8. The system of claim 1, wherein the electrical receptacle comprises an electrical outlet.

9. The system of claim 1, wherein the electrical receptacle comprises a light switch configured to selectively provide power to a lamp external to the electrical receptacle.

10. The system of claim 9, wherein the indicator comprises a periodic flashing of the lamp when the lamp is on.

11. The system of claim 9, wherein the indicator comprises a dimming of the lamp.

12. The system of claim 1, wherein the indicator comprises an audio indicator.

13. The system of claim 12, wherein the audio indicator comprises optional settings based on time of day.

14. The system of claim 1, wherein the indicator comprises a display screen.

15. The system of claim 1, wherein the electrical receptacle adjusts a power output level of the electrical receptacle under predetermined conditions.

16. The system of claim 15, wherein adjusting the power output level includes turning the power output on or off.

17. The system of claim 15, wherein adjusting the power level is based at least in part on sensing a power draw that exceeds a threshold level.

18. The system of claim 1, wherein the centralized control module interfaces with the Internet to retrieve the status data.

19. A power status-indicating electrical pass-through device, comprising:
    an electrical device having an electrical plug and at least one electrical socket;
    a signal receiver to continuously retrieve and interpret power status data from a centralized control module, the power status data comprising at least, real-time electricity pricing data received from an electrical utility provider, wherein the centralized control module is a residential gateway that provides broadband connectivity for a premises network of the premises, wherein the centralized control module analyzes non-interpreted data and generates interpreted data including power status data from the non-interpreted data; and
    one or more indicators activated by the signal receiver, the activation based at least in part on the power status data, including the real-time electricity pricing data, the one or more indicators comprising a multi-colored LED indicator on the surface of the receptacle, the LED indicator displaying a first color based on the real-time electricity pricing data indicating a favorable period to operate and displaying a second color based on the real-time electricity pricing data indicating an unfavorable period to operate.

20. The system of claim 19 wherein the electrical device is a power strip.

21. The system of claim 19 wherein the electrical device is a power outlet expander.

22. A power status indication device, comprising:
    a first communication interface providing communication with a centralized control module, wherein the centralized control module is a residential gateway that provides broadband connectivity for a premises network of the premises, wherein the centralized control module analyzes non-interpreted data and generates interpreted data including power status data from the non-interpreted data;
    a signal receiver to continuously receive and interpret power status data from the centralized control module, the power status data comprising real-time electricity pricing data received from an electrical utility provider;

a second communication interface providing communication with at least one appliance connected to the home network; and a signal transmitter to transmit an electrical signal for reception by the at least one appliance, in response to predetermined conditions based at least in part on the power status data, including the real-time electricity pricing data, wherein the electrical signal activates a luminary indicator based on the power status data, including the real-time electricity pricing data, the luminary indicator comprising a multi-colored LED indicator, the LED indicator displaying a first color based on the real-time electricity pricing indicating a favorable period to operate and displaying a second color based on the real-time electricity pricing indicating an unfavorable period to operate.

23. The system of claim 22, wherein the power status indication device further comprises an input to receive input electric current and an output to provide output electric current to the at least one appliance, and wherein the power status indication device is configured to modify an output power level of the output current, in response to receiving an instruction signal over the first communication interface.

24. The system of claim 23, wherein the power status data comprises the instruction signal.

25. The system of claim 23 wherein the instruction signal comprises communication from a user.

26. The system of claim 25, wherein the communication from the user is received from a remote control device.

27. The system of claim 25, wherein the communication from the user is received from a wireless phone.

28. The system of claim 22, wherein the transmitted electrical signal activates a visual indicator indicating the power status.

29. The system of claim 22, wherein the transmitted electrical signal activates a display screen indicator indicating the power status.

30. The system of claim 22, wherein the at least one appliance comprises a smart appliance that adjusts a power usage of the smart appliance in response to the transmitted electrical signals.

31. The system of claim 20, wherein the second communication interface performs power on and off functions for the at least one appliance.

32. The system of claim 22 wherein the predetermined conditions are based at least in part on profile data established by at least one of a utility company and a user.

33. The system of claim 22, wherein the power status indication device further comprises an override option, the override option activated by an override signal from at least one of a utility company and a user.

* * * * *